United States Patent [19]

Callaway, Jr.

[11] Patent Number: 5,940,757
[45] Date of Patent: Aug. 17, 1999

[54] COMMUNICATION SYSTEM AND METHOD FOR SELECTING ALTERNATIVE FREQUENCIES

[75] Inventor: Edgar Herbert Callaway, Jr., Boca Raton, Fla.

[73] Assignee: Motorola, Inc., Schaumburg, Ill.

[21] Appl. No.: 09/031,649

[22] Filed: Feb. 27, 1998

[51] Int. Cl.[6] .................................................. H04Q 7/10
[52] U.S. Cl. .................. 455/426; 455/38.1; 455/560; 340/825.44
[58] Field of Search .................................... 455/426, 435, 455/445, 458, 466, 507, 509, 552, 553, 560, 556, 557, 31.3, 38.1, FOR 100, FOR 113; 370/465, 466; 340/825.44, 825.54

[56] References Cited

U.S. PATENT DOCUMENTS

| | | | |
|---|---|---|---|
| 5,153,903 | 10/1992 | Eastmond et al. | 455/426 |
| 5,239,306 | 8/1993 | Siwiak et al. | 340/825.44 |
| 5,283,570 | 2/1994 | DeLuca et al. | 340/825.4 |
| 5,392,452 | 2/1995 | Davis | 455/38.1 |
| 5,696,500 | 12/1997 | Diem | 340/825.44 |
| 5,706,331 | 1/1998 | Wang et al. | 455/38.1 |

*Primary Examiner*—Lee Nguyen
*Attorney, Agent, or Firm*—Keith A. Chanroo

[57] ABSTRACT

A communication system (100) that selects alternative data channels for communication has a base station (106) coupled to a plurality of alternative data communication systems (112, 114, 116) that receive messages intended for a selective call device designated by an address. A data scheduler (104), coupled to the base station (106) and the plurality of alternative data communication systems (112, 114, 116), has a categorizer (404) for categorizing the message as being suitable for transmission on an alternative data channel, a controller (402) for coordinating a list of the alternative data communication systems suitable for transmitting the message and a selector (406) for selecting the alternative data channel for transmitting the message. A controller (105) encodes a selective call signal with the address and a vector and a transmitter transmits the selective call signal to the selective call device (102) on a control channel including the address for identifying the selective call device the vector designating the alternative data channel.

7 Claims, 5 Drawing Sheets

COMMUNICATION SYSTEM AND METHOD FOR SELECTING ALTERNATIVE FREQUENCIES

FIELD OF THE INVENTION

This invention relates in general to communication systems, and more specifically to a method and apparatus for selecting alternative frequencies of other transmission systems for transmitting selective call messages.

BACKGROUND OF THE INVENTION

There are many communication systems in operation today, including virtually all of today's selective call systems, that utilize frequency modulation (FM) for addressing, and for data and voice transmission. The current communication subscriber units, e.g., selective call devices, utilize sophisticated receiver architectures, and today's selective call systems utilize well known and established signaling formats. The current receiver architectures and signaling formats have been optimized to provide both high receiver sensitivities and excellent battery saving capabilities.

In many metropolitan areas, many selective call systems are operated at, or near, the maximum system capacity, in both the number of subscribers that can be accommodated, and the message transmission time that is available. Such selective call system operation has resulted in reduced customer satisfaction due to extended times required to access the selective call system, and also due to extended delays in message delivery due to equally extended selective call system message transmission queues. At present, this need is being met by increasing the data rate of the protocol used or increasing the latency time by requiring the selective call devices to battery save longer.

To further aggravate the problem, the limited radio spectrum available worldwide or nationwide makes it challenging to provide seamless communication to and from the selective call devices. It has become necessary to equip the selective call devices with frequency synthesizers to enable them to scan or select among the frequencies within the available selective call spectrum when the selective call devices are roaming or has lost their signal. However, because there are a limited number of available selective call frequencies, no significant system expansions can be achieved or expected although there is a significant increase in the message length and the number of subscribers.

Thus, what is needed is a selective call system that can improve message delivery without the need for any addition of dedicated selective call frequency allocation.

DESCRIPTION OF A PREFERRED EMBODIMENT

Figure 1:
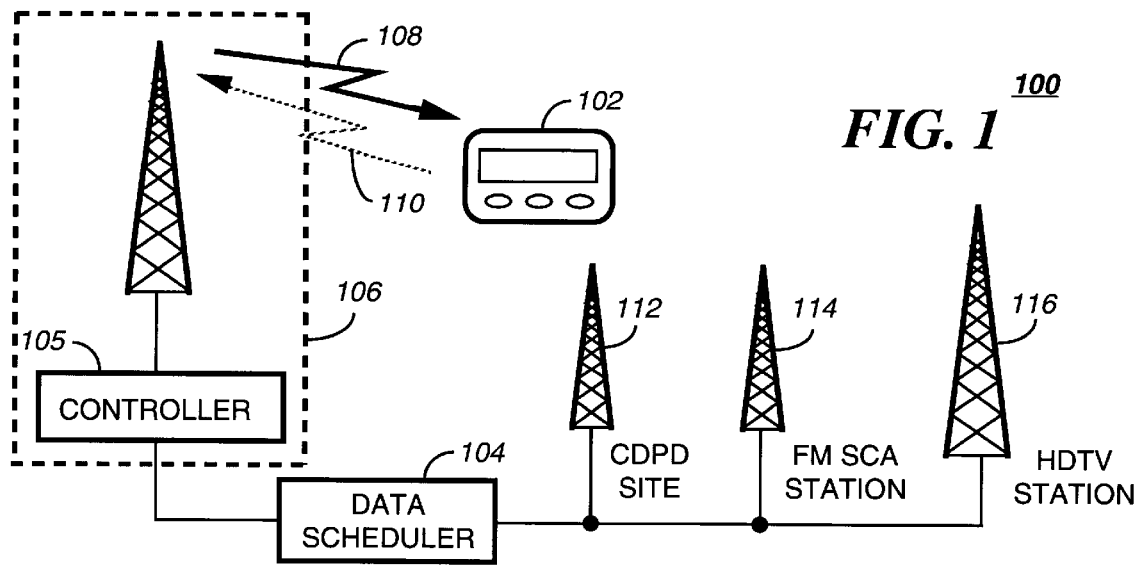
FIGS. 1–3 are electrical block diagram of a communication system, in accordance with the preferred embodiment of the present invention.
Figure 2:
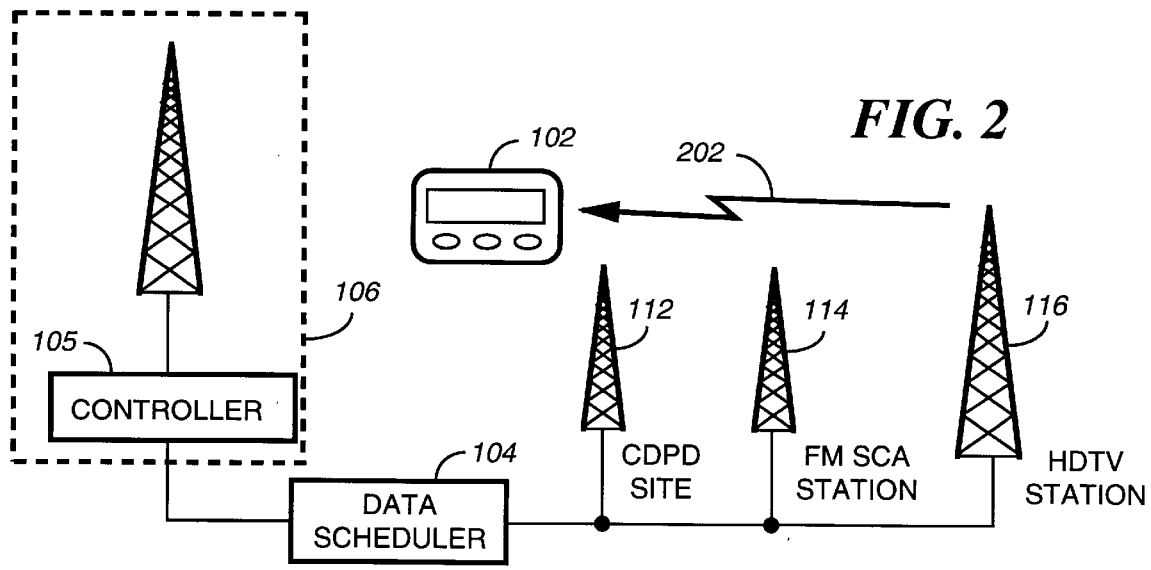
Figure 3:
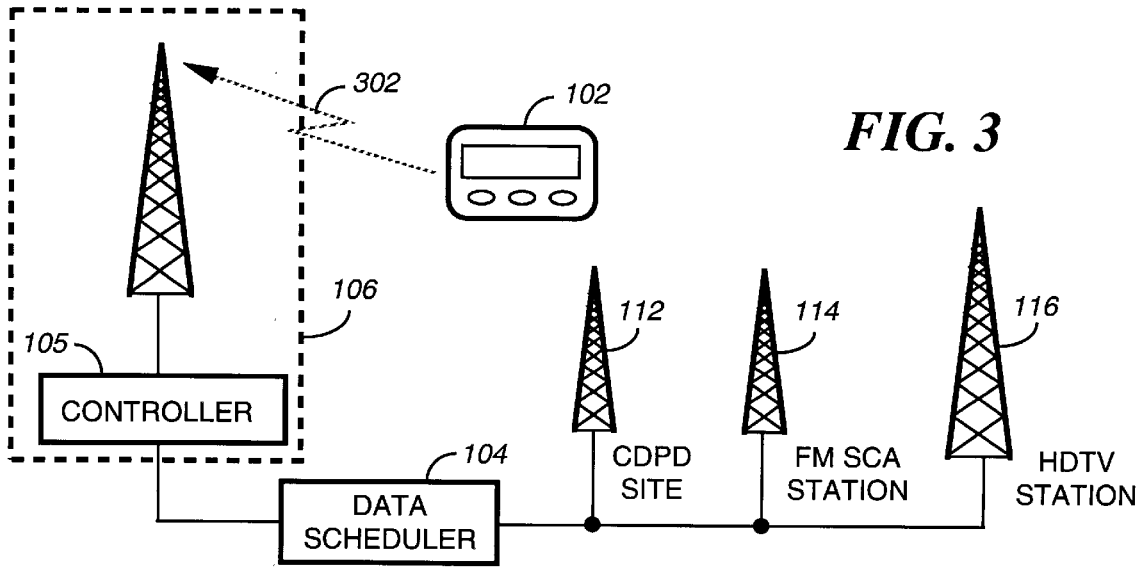

Referring to FIGS. 1–3, electrical block diagrams of a communication system coupled with other alternative data communication systems are shown in accordance with the preferred embodiment of the present invention. Referring specifically to FIG. 1, the communication system 100 preferably comprises a selective call communication system (a base station controller 105 and antenna) 106 coupled to a data scheduler 104. The data scheduler 104 is coupled to a plurality of other alternative wireless data communication systems, e.g., Cellular Digital Packet Data (CDPD) communication system 112, FM Sub-Carrier Authorized (FM SCA) Station 114, and Grand Alliance High Definition Television (HDTV) Station 116. A selective call device (or portable communication unit) 102 is wirelessly coupled to the selective call communication system 106 and communicates with the selective call communication system 106, preferably, on the InFLEXion™ protocol. The timing and data structures of the InFLEXion protocol are well know to those skilled in the art of selective call communication systems. Those skilled in the art understand that the InFLEXion protocol is designed to accommodate voice communication.

Operationally, the selective call communication system 106, upon receipt of a message for a designated selective call device 102, transmits preferably a selective call signal 108 to the selective call device 102. The selective call signal comprises the address for identifying the selective call device and the vector designating a frequency of an alternative data communication system. In addition, the vector of the selective call signal can include a protocol for identifying a data structure, a time designation for informing the selective call device when the message will be transmitted and a message packet identification code for identifying the message to be received. The selective call device 102 receives and decodes the address and the vector. The vector can direct the selective call device 102 to another or alternative frequency or channel that is not within the set of channels allocated to the selective call spectrum and can identify the message to be received with a message or the packet identification. Therefore, after decoding its correct address, the selective call device 102 decodes the alternative frequency assignment and switches to that channel (or frequency) and loads the appropriate protocol decoder; the protocol decoder identifies or defines how the message or information is to be received and decoded. The details of switching the frequency and selecting the protocol decoder will be discussed in details below. With a two-way selective call device 102, the selective call device 102 will or can acknowledge 110 its receipt of its address and vector assignment 110 on the control channel, preferably the InFLEXion protocol, which acts as the preassigned control (or default) channel.

Referring to FIG. 2, after the selective call device 102 has switched to the alternative data communication frequency and the protocol decoder designated by the vector assignment has been loaded, it begins to listen on the alternative data channel, which, e.g., could be a frequency on the set of frequencies allocated for transmission by the HDTV stations. It is understood that the selective call device 102 will switch and remain on the alternative channel to receive its message, preferably for a predetermined time period. The HDTV transmission system 116 will transmit 202 the message to the selective call device 102 during the designated or available time and on the correct frequency. After a predetermined time has expired, the selective call device 102 will switch back to the InFLEXion control channel and inform the selective call communication system 106 whether or not the message was received by acknowledging 302 the status to the selective call system 106 as shown in FIG. 3.

Although not shown, the selective call communication system, as is well known, is coupled to a communication link, e.g., a public switched telephone network (PSTN) for receiving requests to transmit messages or information to a subscribing selective call device 102. The selective call communication system 106 can be wirelessly coupled to other data providers, like the stock market and other information services. When a request is received, particularly, a request to transmit a long message, e.g., data or information service type message, during, e.g., the peak hours of the selective call communication system 106, the data scheduler 104 will poll (or initiate a request to) the alternative data systems to select the best (or available) candidate to use to transmit the message to the designated selective call device 102. The selection can be based on a list of criteria including but not limited to the type of system protocol, the frequency, the cost and the ease of the selective call device to decode the message on the alternative frequency with the alternative protocol. Alternatively, the alternative data systems 112, 114, 116 can provide to the data scheduler 104, before hand, a list of times when they will be available for transmission of selective call messages.

The data scheduler 104 will have all the specification on all the alternative data systems, including, e.g., the channels (frequencies) and protocols which stipulate the data structures. This information is preprogrammed into the selective call devices 102. Therefore, for example, by using a code, e.g., the vector, the selective call device 102 would know the channel (frequency) to switch to, the data structures and the time that it has to remained tuned to that channel to receive its message. All the alternative data systems can have different wait times because of the protocol difference and the system loading.

It should be noted that the data scheduler 104 is capable of operating in a distributed transmission control environment (wired and wireless) that allows mixing conventional cellular, simulcast, satellite, or other coverage schemes involving a plurality of radio frequency transmitter/receivers and conventional antennas for providing reliable radio signals within a geographic area as large as a worldwide network.

Figure 4:
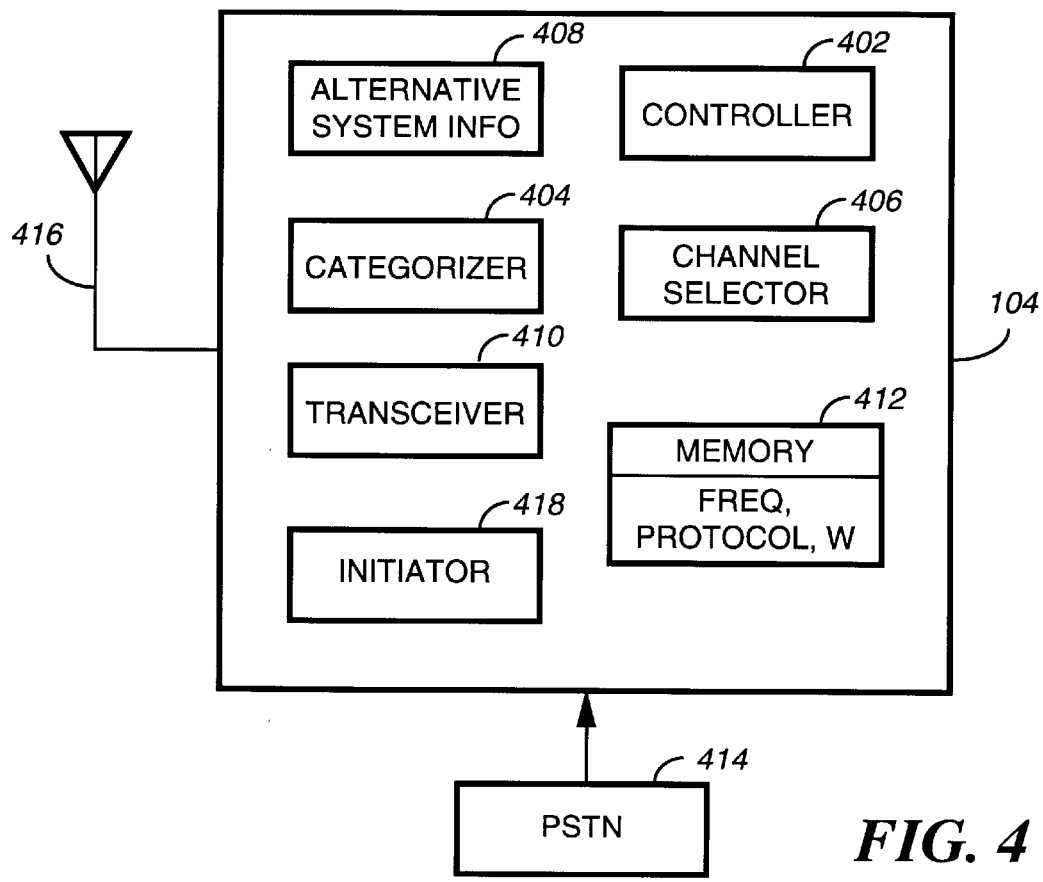
FIG. 4 is an electrical block diagram of a data scheduler according to FIGS. 1–3.

Referring to FIG. 4, an electrical block diagram of the data scheduler is shown. The data scheduler 104 preferably comprises a controller 402 for coordinating a list of the alternative data communication systems suitable for transmitting the selective call message or information. The controller 402 creates and retrieves information on the alternative communication system in memory, preferably a random-access-memory (RAM), e.g., the alternative system information 408. The alternative system information 408 can include information such as the availability of the each alternative system, its loading, latency, the cost for transmitting a message during different periods of time, etc. A categorizer 404 coupled to the controller 402 categorizes the message as a candidate for transmission on an alternative frequency channel. The categorizer 404, e.g., measures or count the number characters in a message and when the number exceeds a predetermined number (threshold), e.g., 50 to 100 characters, the message is characterized as a long message which is suitable for transmission by an alternative data system. A channel selector 406 selects the alternative data channel suitable for transmitting the message and retrieves the frequency, protocol and wait time from memory 412. It is understood that any changes in the alternative data system can be wirelessly communicated to the selective call devices by over-the-air (OTA) updates. The data scheduler 104 is shown coupled to an antenna 416 and a communication link, for example a public switch telephone network (PSTN), 414 which will enable the data scheduler 104 to communicate, e.g., with the selective call devices 102 and send OTA updates. The PSTN 414 enables the data scheduler 104 to continually receive information from the alternative data communication system. A transceiver 410, the operation of which is well known to those skilled in the art, enables the receipt and transmission of information to and from the data scheduler 104. The data scheduler 104 comprises a memory, preferably an erasable memory, 412 that stores information about the alternative data systems, e.g., the frequencies, the protocol, the wait times, etc. An initiator 418 initiates a retransmission of the message when the selective call device has indicated that the message was not received by either selecting another or the same alternative data channel for retransmitting the message.

Figure 5:
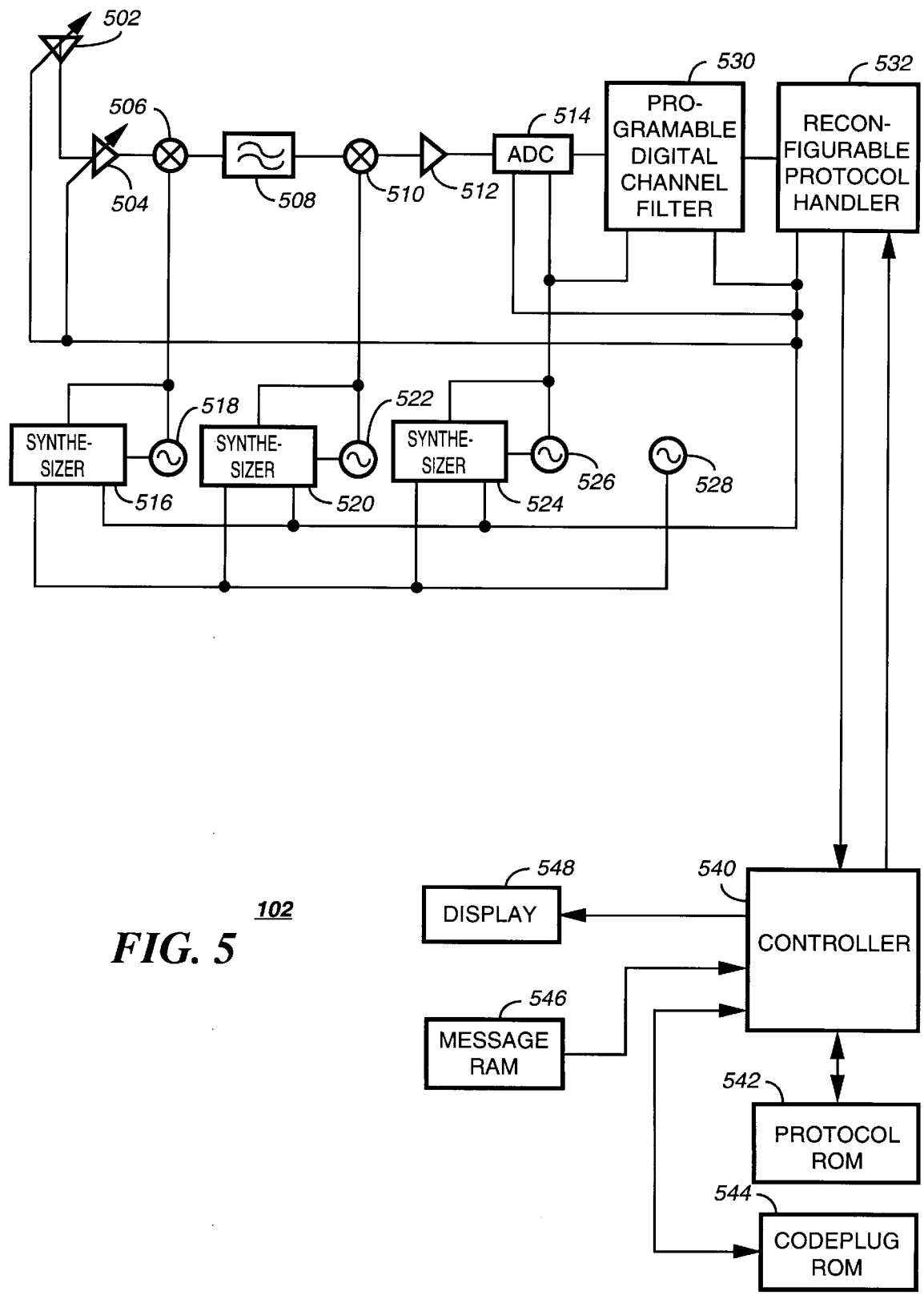
FIG. 5 is an electrical block diagram of a selective call device according to the preferred embodiment of the present invention.

Referring to FIG. 5, an electrical block diagram of the selective call device 102 according to the preferred embodiment of the invention. It is understood by one skilled in the art that since the invention uses alternative channels of other communication systems, the operating bandwidth of the selective call device 102 is increased. A selective call device 102 that is able to operate and receive information on the alternative data systems should be able to receive information on a frequency band of approximately 54 MegaHertz (MHz) to about 941 MHz. The receiver portion preferably has an antenna 502 that is adjustable to receive information over the entire bandwidth. The antenna 502 is coupled to a radio frequency (RF) amplifier 504. A first mixer 506 mixes the received frequency up to 1030 MHz which is provided to a bandpass filter 508, a second mixer 510 and an intermediate frequency (IF) amplifier 512 coupled in series to an Analog-to-Digital-Converter (ADC) 514. A first synthesizer 516 and a first local oscillator (LO) 518 are coupled to the first mixer 506, a second synthesizer 520 and a second local oscillator 522 are coupled to the second mixer 510 while a third synthesizer 524 and a third local oscillator 526 are coupled to the ADC 514. A reference oscillator 528 controls the first, second, and third synthesizer and oscillator pairs. The receiver employs a high first IF, above the receive band (1030 MHz for example) which moves the first image and the first IF spurs very far from the receive band eliminating the need for a tunable preselector. After a second conversion to a lower IF, the desired signal is passed through the ADC 514 then to a programmable digital channel filter 530 and then to a reconfigurable protocol handler 532 for demodulation and further processing. The reconfigurable protocol handler 532 is coupled to the controller 540 which is coupled to the protocol Read-Only-Memory (ROM) 542 which stores a plurality of protocols associated with the plurality of alternative data communication systems 112, 114, 116. The controller 540 is also coupled to the codeplug read-only-memory (ROM) 544 which stores the addresses of the selective call devices 102. A message RAM 546 coupled to the controller 540 stores the messages that are received and a display 548 displays or presents the messages to the user.

The antenna 502 and RF amplifier 504 are tunable across the receive band. The first mixer 506 receives the desired 54-to-941 MHz signal from the RF amplifier 504, and mixes it with the 1084-to-1971 MHz LO to produce the 1030 MHz first IF frequency. This IF signal is sent to the first IF filter 508, preferably a Surface Acoustic Wave (SAW) filter, wide enough to handle the widest expected signal deviation, e.g., 6 MHz. The signal is then sent to the second mixer 510, which mixes it with a 984.9 MHz second LO signal to produce the 45.1 MHz second IF signal. The second LO frequency may be varied +/−3 MHz to receive any single signal within the 6 MHz first IF passband. The second IF signal is amplified and passed to the ADC 514.

Operationally, when the selective call device 102 receives its address, it checks the vector associated with the address to determine if the message will be transmitted on an alternative communication system. It is possible, e.g., to encode two or more bits to designate the alternative communication system's frequency and protocol. Therefore, when the selective call device 102 receives the encoded vector, it retrieves the information including the frequency and data structures from the protocol ROM 542. Alternatively, the frequency of the alternative communication systems may be explicitly included in the vector associated with the message. The receive filters and frequency synthesizers will be set to switch to and receive the message on the alternative data communication system.

Figure 6:
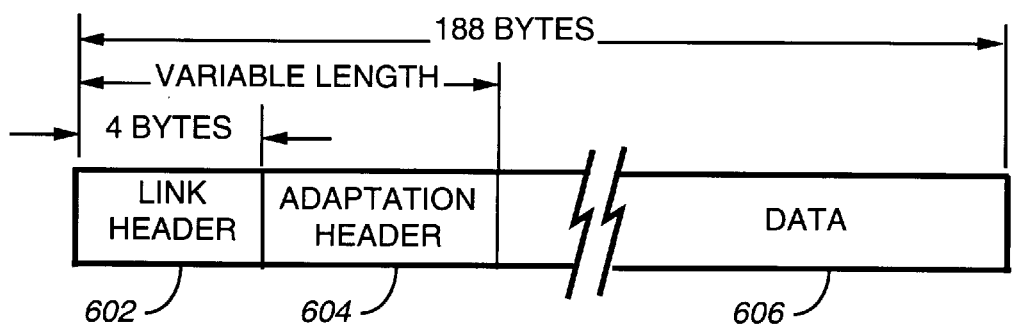
FIG. 6 is a timing diagram illustrating the transmission format of the Grand Alliance High Definition Television (HDTV) in accordance with the preferred embodiment of the present invention.

Referring to FIG. 6, a timing diagram of the Grand Alliance HDTV protocol is shown illustrating the transmission format of one of the alternative data HDTV communication station 116. The data structure or packet formation 600 of the HDTV comprises a link header 602 of 4 bytes, an adaptation header 604 which can have a variable length. The data 606 is appended to the variable length header resulting in a 188 byte total length. There is a 3 bits-per-symbol rate.

Figure 7:
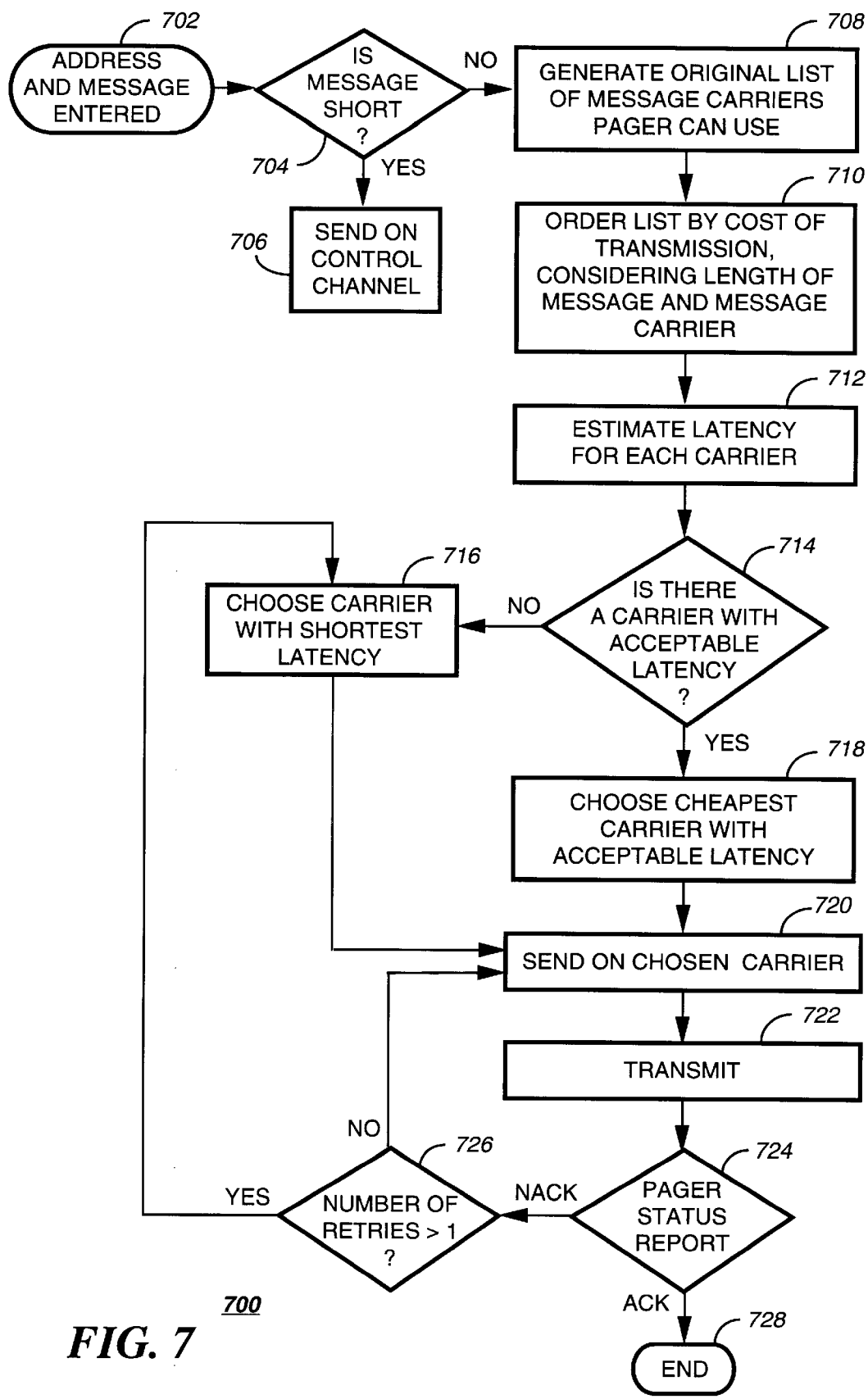
FIG. 7 is a flow diagram illustrating a method for determining and coordinating alternative frequencies for communication in accordance with the preferred embodiment of the present invention.

Referring to FIG. 7, a method for determining and coordinating alternative frequencies for communication. When a user enters an address and a message via the PSTN for example, the selective call base station receives it, step 702, and determines if the message is a short message, step 704. A short message can be designated as having fewer than a predetermined number of alphanumeric characters, e.g., 50 or 100, depending on the selective call system's capacity or latency. If it is a short message, it is transmitted on the preassigned control channel of the InFLEXion protocol, i.e., the selective call device is not directed to switch to any alternative data channel, step 706. When a long message is received, a list of the alternative data systems are retrieved or generated to determine which alternative data system is more suited to carry the message, step 708. The selective call system selects the alternative data system based on some predetermined criteria, e.g., the cost of transmission, the length of the message to be transmitted, the latency of the alternative data system, and the type of message carrier, step 710. The type of carrier can be ranked depending on the protocol, its frequency or its latency, etc. The selective call system estimates the latency of the selected alternative data systems, step 712, and determine which of the alternative data systems are suitable, step 714. If none of the alternative data system has acceptable latency, step 714, the selective call system can select the alternative data system with the shortest latency, step 716. On the other hand, if all or more than one of the alternative data system have acceptable latency 714, the selective call system preferably selects the alternative data system with the lowest cost for transmission of the message with the desired latency, step 718. The message from either steps 716 and 726 is then encoded according to the protocol of the alternative data system and passed to the alternative data system to transmitted in at designated time, step 720. The address and the vector is transmitted to the selective call device 102 to enable the selective call device 102 to switch to the alternative data system identified by the vector, step 722. The selective call system waits to receive a status report from the selective call device 102 to determine whether the message was received or not, step 724. An affirmative report ends the transmission sequence for that message, step 728. When the selective call device 102 reports that it failed to receive the message, the selective call system retransmits the message more times within a predetermined time, step 726. If the time expires and the selective call device 102 fails to receive the message, step 726, the selective call system can select another alternative data system to transmit the message, step 716.

Figure 8:
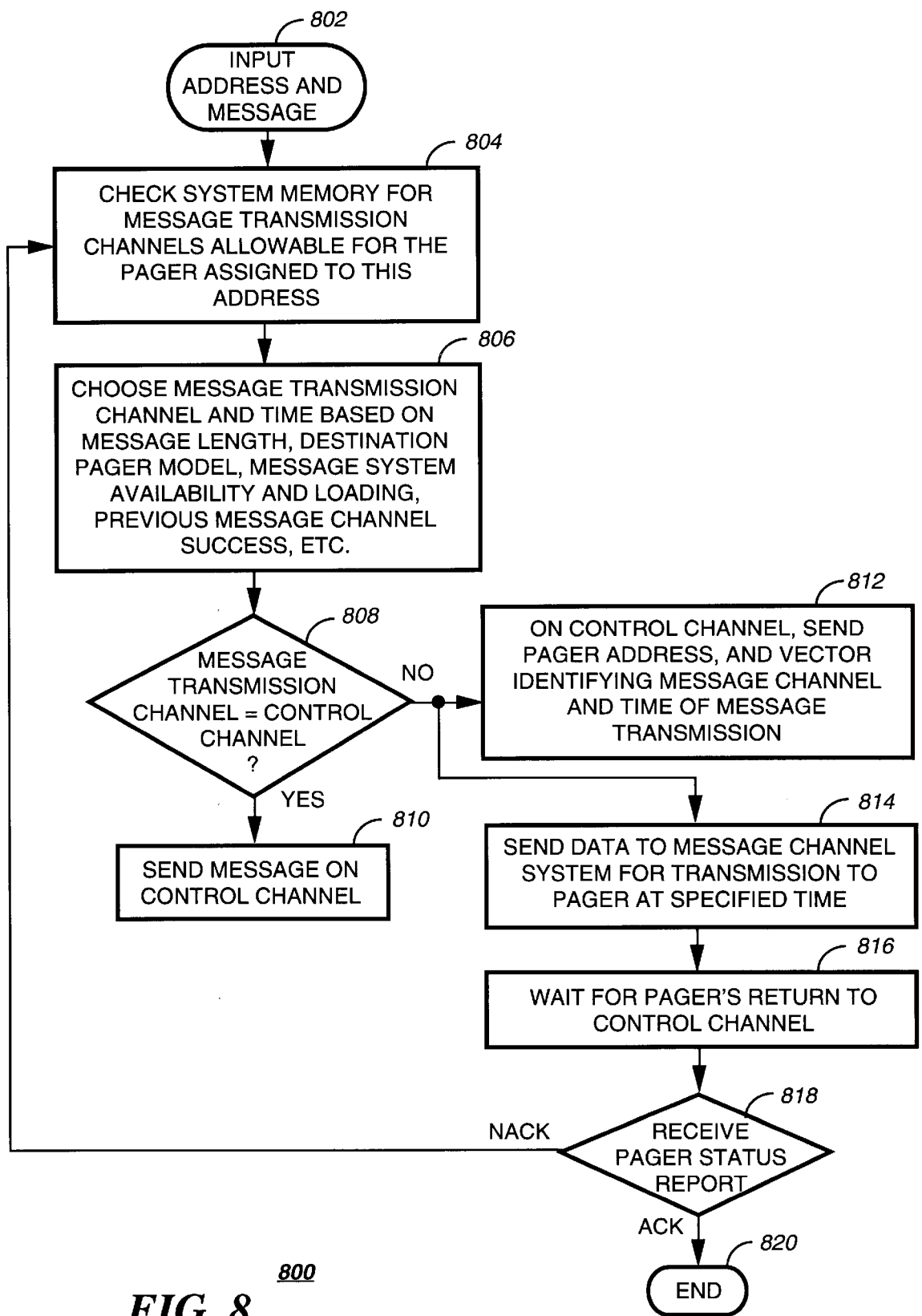
FIG. 8 is a flow diagram illustrating the method for determining and coordinating alternative frequencies of the data scheduler according the preferred embodiment of the present invention.

Referring to FIG. 8, upon the input of the address and message, step 802, the data scheduler checks the system memory for the list of allowable transmission channels for that selective call device assigned to the received address, step 804. The transmission channel or alternative data system is chosen and the time for retransmission is selected based upon the message length, the destination selective call model, alternative data system availability, loading, and previous message channel success, etc., step 806. Based on the criteria of step 806, if the InFLEXion channel (control channel) is selected, the message is appended to the address and vector according to the InFLEXion data structure which is well know in the art and is transmitted to the selective call device, step 810.

On the other hand, when the message is chosen for transmission on an alternative data channel (not the InFLEXion control channel), the address of the selective call device 102, the vector identifying message channel, protocol, and the time when the message will be transmitted is determined, step 812. The message, the transmission time, and the selective call address is transferred to the data scheduler 104, step 814. It is understood that the data scheduler 104 can contact the alternative data system to determine the times that are available for transmission of the selective call message. The data scheduler 104 waits for a response from the selective call device 102 via the selective call base station 106, step 816. The data scheduler determines from the status report if the message was received or not, step 818. If the message was received, the process ends, step 820, otherwise process transfers to step 804 to check for allowable channels.

In this way, a selective call communication system is able to coordinate and select alternative channels from other communication or transmission systems when these other systems have available resources. This technique allows for efficient low-cost communication, because the selective call device can decide on a case-by-case basis which messages are to be transmitted on the outside or alternative transmission resources. With this invention, the selective call system can designate other transmission systems that are apt to transmit longer messages to a selective call device thereby improving the latency time of the selective call system. There message delivery is improved without the necessity of expanding the dedicated selective call frequencies.

In summary, a selective call communication system that coordinates and selects alternative data channels for communication comprises a base station coupled to a plurality of alternative data communication systems which receive messages intended for a selective call device designated by an address. A data scheduler coupled to the base station and the plurality of alternative data communication systems comprises a categorizer for categorizing the message as a candidate for transmission on an alternative data channel. The categorizer determines if a length of the message is greater than a threshold, a controller coordinates a list of the alternative data communication systems suitable for transmitting the message, a selector selects the alternative data channel suitable for transmitting the message and creates and stores a list of alternative data channels, and an initiator initiates a retransmission of the message when the selective call device has indicated that the message was not received. The initiator selects another alternative data channel for retransmitting the message. An encoder encodes a selective call signal including the address and a vector wherein the vector includes a delay for designating a time period for waiting for a response from the selective call device to determine if the message was received on the alternative data system. A transmitter transmits the selective call signal to the selective call device on a control channel wherein the selective call signal comprises the address for identifying the selective call device. The vector designates a frequency of the alternative data system. A protocol identifies the data structure and a time designation for informing the selective call device when the message will be transmitted and an PSTN for transferring the message to an alternative data communication system for transmission during a specified time. The selective call signal comprises the address for identifying the selective call device and the vector designating a frequency of an alternative data communication system, a protocol for identifying a data structure, a time designation for informing the selective call device when the message will be transmitted, and a time delay for waiting for a response from the selective call device to determine if the message was received on the alternative data communication system.

I claim:

1. A selective call communication system for coordinating and selecting alternative data channels for communication, comprising:

a base station coupled to a plurality of alternative data communication systems for receiving a message intended for a selective call device designated by an address;

a data scheduler coupled to the base station and the plurality of alternative data communication systems, the data scheduler comprising:
  a categorizer for categorizing the message as being suitable for transmission on an alternative data channel;
  a controller for coordinating a list of alternative data communication systems suitable for transmitting the message;
  a selector for selecting the alternative data channel suitable for transmitting the message;

a controller for encoding a selective call signal including the address and a vector;

a transmitter for transmitting the selective call signal to the selective call device on a control channel; and a communication link for transferring the message to an alternative data communication system for transmission.

2. The selective call communication system according to claim 1 further comprising an initiator for initiating a retransmission of the message when the selective call device has indicated that the message was not received.

3. The selective call communication system according to claim 2 wherein the initiator initiates a retransmission by selecting another alternative data channel.

4. The selective call communication system according to claim 1 wherein the categorizer determines if a length of the message is greater than a threshold.

5. The selective call communication system according to claim 1 wherein the selector creates and stores a list of alternative data channels.

6. The selective call communication system according to claim 1 wherein selective call signal further comprising:
  the address for identifying the selective call device;
  the vector designating a frequency of an alternative data communication system;
  a protocol for identifying a data structure;
  a message packet identification code for identifying the message; and
  a time delay for waiting for a response from the selective call device indicating that the message corresponding to the message packet identification code was received on the alternative data communication system.

7. A selective call communication system for coordinating and selecting alternative data channels for communication, comprising:

a base station coupled to a plurality of alternative data communication systems, the base station receives a message intended for a selective call device designated by an address and a message packet identification code;

a data scheduler coupled to the base station and the plurality of alternative data communication systems, the data scheduler comprising:
  a categorizer for categorizing the message as being suitable for transmission on an alternative data channel, the categorizer determines if a length of the message is greater than a threshold;
  a controller for coordinating a list of alternative data communication systems suitable for transmitting the message;
  a selector for selecting the alternative data channel suitable for transmitting the message, creates and stores a list of alternative data channels;
  an initiator for initiating a retransmission of the message when the selective call device has indicated that the message was not received, the initiator selects another alternative data channel for retransmitting the message;

a controller for encoding a selective call signal including the address and a vector, the vector includes a frequency for designating an alternative data communication system;

a transmitter for transmitting the selective call signal to the selective call device on a control channel wherein the selective call signal comprises the address for identifying the selective call device, the vector designating the frequency of the alternative data communication system and the message packet identification code for identifying the message to be received; and a communication link for transferring the message to an alternative data communication system for transmission during a specified time.

* * * * *